L. L. KNOX.
REVERSING REGENERATIVE FURNACE.
APPLICATION FILED SEPT. 4, 1913.

1,102,198.

Patented June 30, 1914.
8 SHEETS—SHEET 1.

Fig. 1.

L. L. KNOX.
REVERSING REGENERATIVE FURNACE.
APPLICATION FILED SEPT. 4, 1913.

1,102,198.

Patented June 30, 1914.
8 SHEETS—SHEET 5.

WITNESSES

INVENTOR

L. L. KNOX.
REVERSING REGENERATIVE FURNACE.
APPLICATION FILED SEPT. 4, 1913.

1,102,198.

Patented June 30, 1914.
8 SHEETS—SHEET 7.

L. L. KNOX.
REVERSING REGENERATIVE FURNACE.
APPLICATION FILED SEPT. 4, 1913.

1,102,198.

Patented June 30, 1914.
8 SHEETS—SHEET 8.

WITNESSES

INVENTOR

UNITED STATES PATENT OFFICE.

LUTHER L. KNOX, OF PITTSBURGH, PENNSYLVANIA, ASSIGNOR TO KNOX PRESSED & WELDED STEEL COMPANY, OF PITTSBURGH, PENNSYLVANIA, A CORPORATION OF PENNSYLVANIA.

REVERSING REGENERATIVE FURNACE.

1,102,198.  Specification of Letters Patent.  Patented June 30, 1914.

Application filed September 4, 1913. Serial No. 788,108.

*To all whom it may concern:*

Be it known that I, LUTHER L. KNOX, a citizen of the United States, residing at Pittsburgh, in the county of Allegheny and State of Pennsylvania, have invented a new and useful Improvement in Reversing Regenerative Furnaces, of which the following is a full, clear, and exact description, reference being had to the accompanying drawings, forming part of this specification, in which—

My invention has relation to reversing regenerative furnaces, and more particularly to the port construction thereof.

The invention is designed to provide a novel construction of the gas ports of the furnace, together with means of novel and effective character whereby the port is cooled and protected in use.

In accordance with my invention I not only provide for water-cooling the nose portion of the gas port, but I also provide means for obtaining an effective air circulation around the entire gas port, thereby largely reducing the amount of water-cooling which is required.

Figure 1:
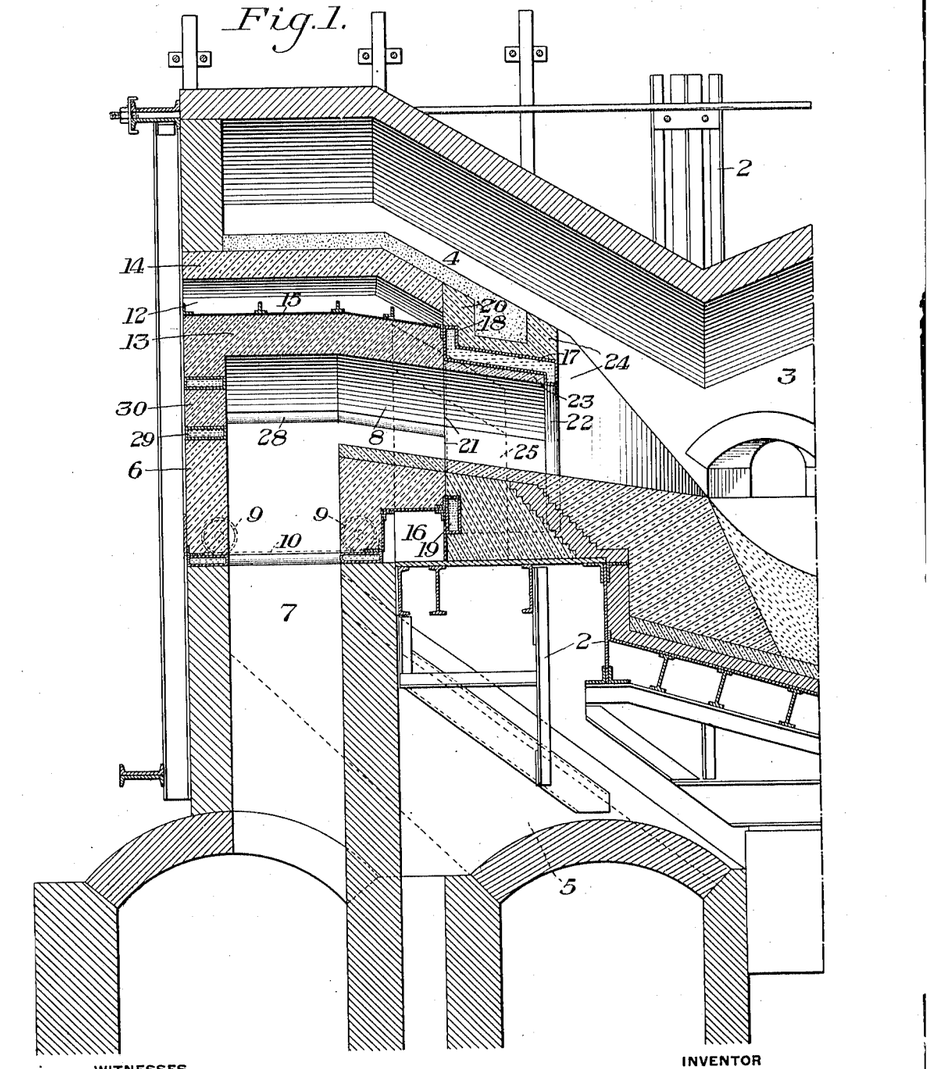
Figure 1 is a vertical section of one end portion of an open hearth furnace embodying my invention.
Figure 2:
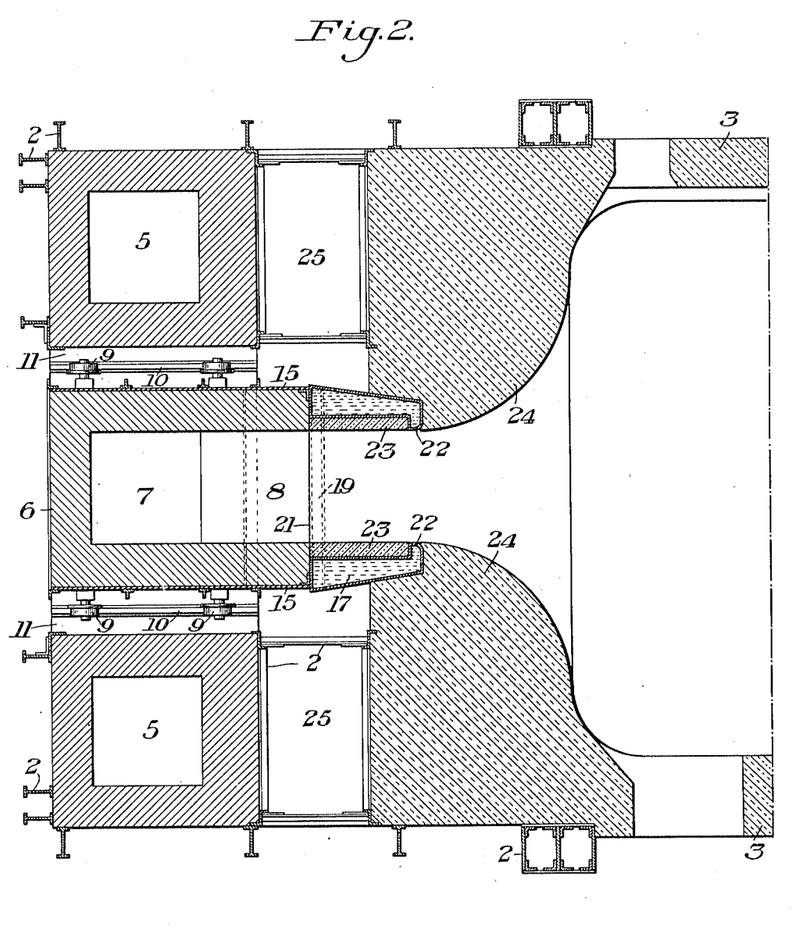
Fig. 2 is a horizontal section of the same.
Figure 3:
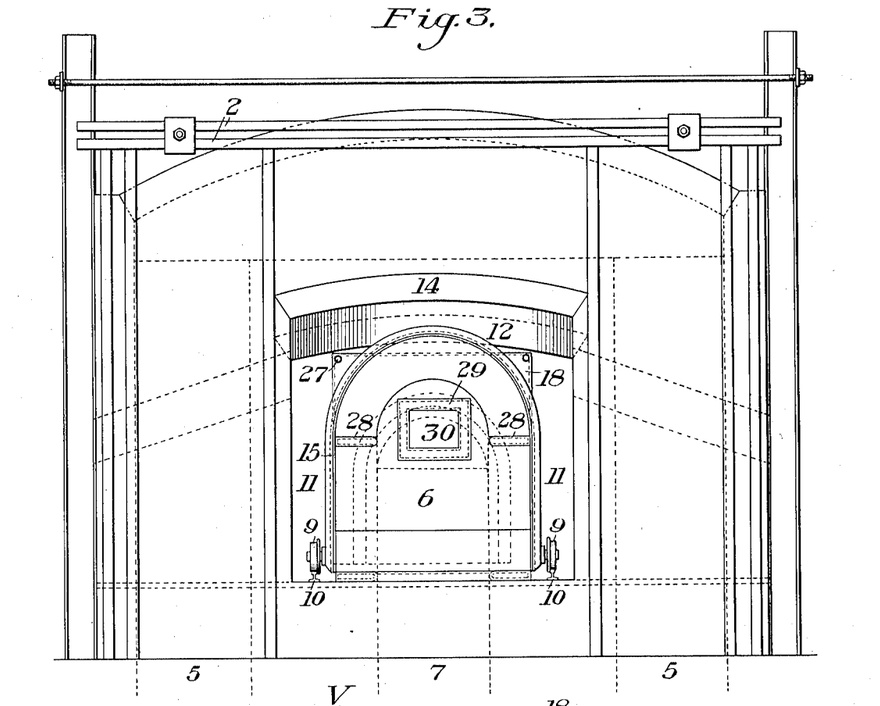
Fig. 3 is an end view.
Figures 4, 5:
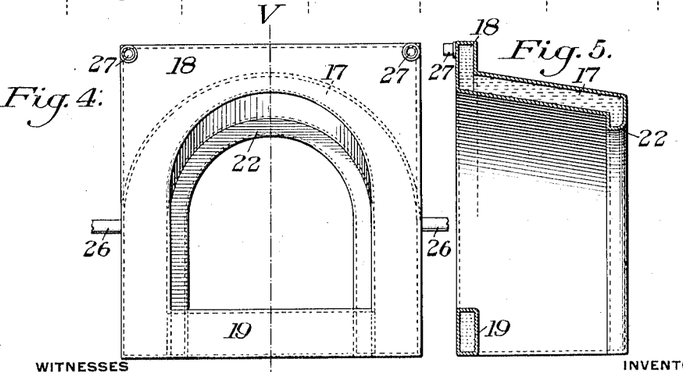
Fig. 4 is an end elevation of the port cooler.
Fig. 5 is a section on the line V—V of Fig. 4.
Figure 6:
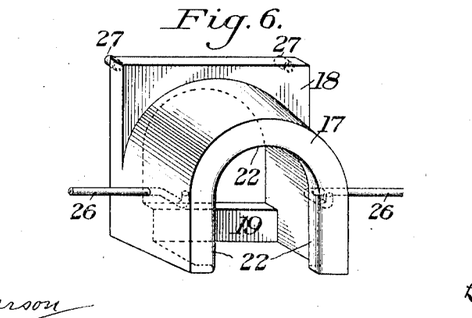
Fig. 6 is a perspective view of the port cooler.

Referring first to that form of my invention which is shown in Figs. 1 to 6, inclusive, the numeral 2 designates the supporting frame of the furnace, and 3 a portion of the body or hearth walls. 4 designates the air port communicating with one end of the furnace, and also with the usual air uptakes 5. 6 designates a removable hood, which forms the upper portion of the gas uptake 7. This hood is of elbow shape, and also forms a portion of the gas port 8. It is preferably mounted on the wheels 9, which are arranged to travel on tracks 10, which extend into the end portion of the furnace between the air uptakes 5. The space between the inner walls of the two uptakes 5 is preferably considerably greater than the transverse width of the hood 6 so as to leave a free air space 11 at each side of the hood, as well as an air space 12 above the top wall 13 of the hood and between it and the bottom wall 14 of the air ports 4. The hood consists of an outer metal frame 15, which supports the refractory material 6. The elbow form of the hood also provides a transverse air space 16 (see Fig. 1) extending underneath the portion 8 of the gas port and communicating with the air spaces 11. This is indicated by the dotted lines in Fig. 2. The nose portion of the gas port, which is the part of the port which rapidly cuts away in use, comprises a hollow metal cooling member having water-circulating connections. This cooling member, which is shown in detail in Figs. 4, 5 and 6, has an arched U-form portion 17, which extends from the inner end of the port back to the joint between the nose portion and the portion 8. Its side legs extend downwardly to the floor of the port at each side; and at its rear or outer end it has the flat upward hollow extension 18 and the bottom hollow cross-connection 19. The portion 18 extends upwardly into the refractory material 20, which forms the floor of the air port. The portions 18 and 19 have their rear side in the vertical plane of the joint 21 with the portion 8 of the gas port, and protect such joint. The front end of the arched portion 17 has the inwardly extending hollow lip or flange 22, which protects the inner refractory lining 23 of this portion of the port, and which is embedded in the blocks 24. 25 designates air spaces between the air uptakes 5 and the end wall of the furnace proper, these air spaces being open to the atmosphere at their outer ends, and at their inner ends communicating with the air spaces 11. In this manner I provide for a constant air circulation, not only around the hood 6, but also at each side of the nose portion of the gas port. It will be also noted that the front wall of the air space 16 forms a part of the joint between the two port portions. By reason of this effective air circulation, I am enabled to very largely reduce the amount of cooling water required for the effective protection of the port. The cooling member 17 may be provided with any suitable system of circulating connections. In Fig. 6 I have shown two supply pipes 26 extending into the side leg portions. The extension 18 is shown as provided at its upper corners with the outlet connections 27. The outer end wall of the hood portion 6 may, if desired, be provided with cooling members 28. I have also shown this end wall as provided with a water-cooled frame 29 inclosing a refractory body 30, which may be removed if desired to permit inspection of the port.

Figure 7:
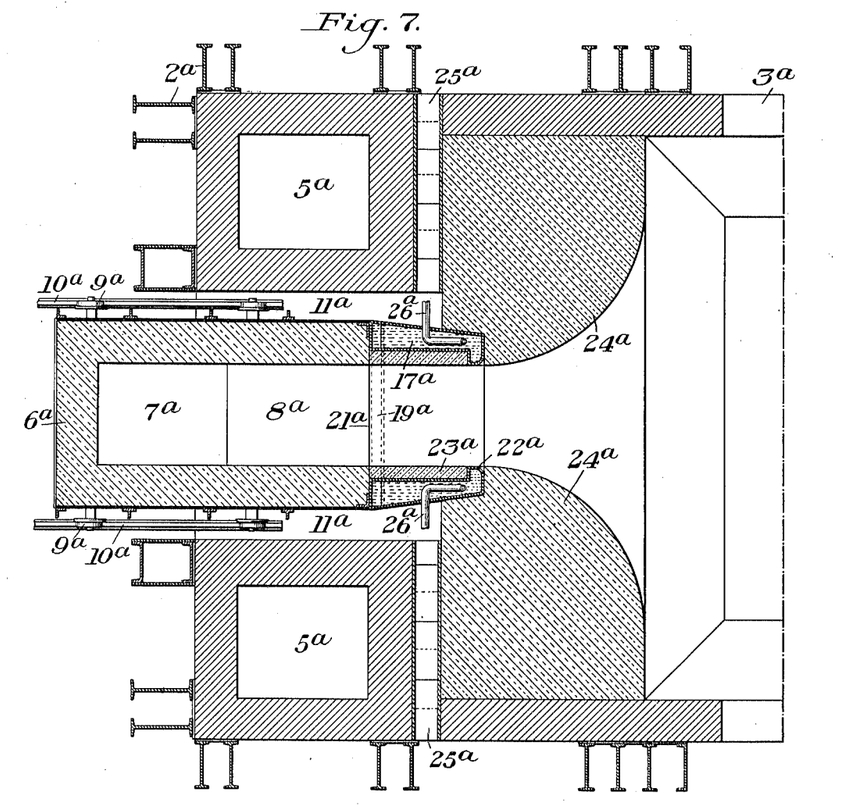
Figs. 7 and 8 are views corresponding respectively to Figs. 1 and 2 but showing the invention applied to a modified form of furnace.
Figure 8:
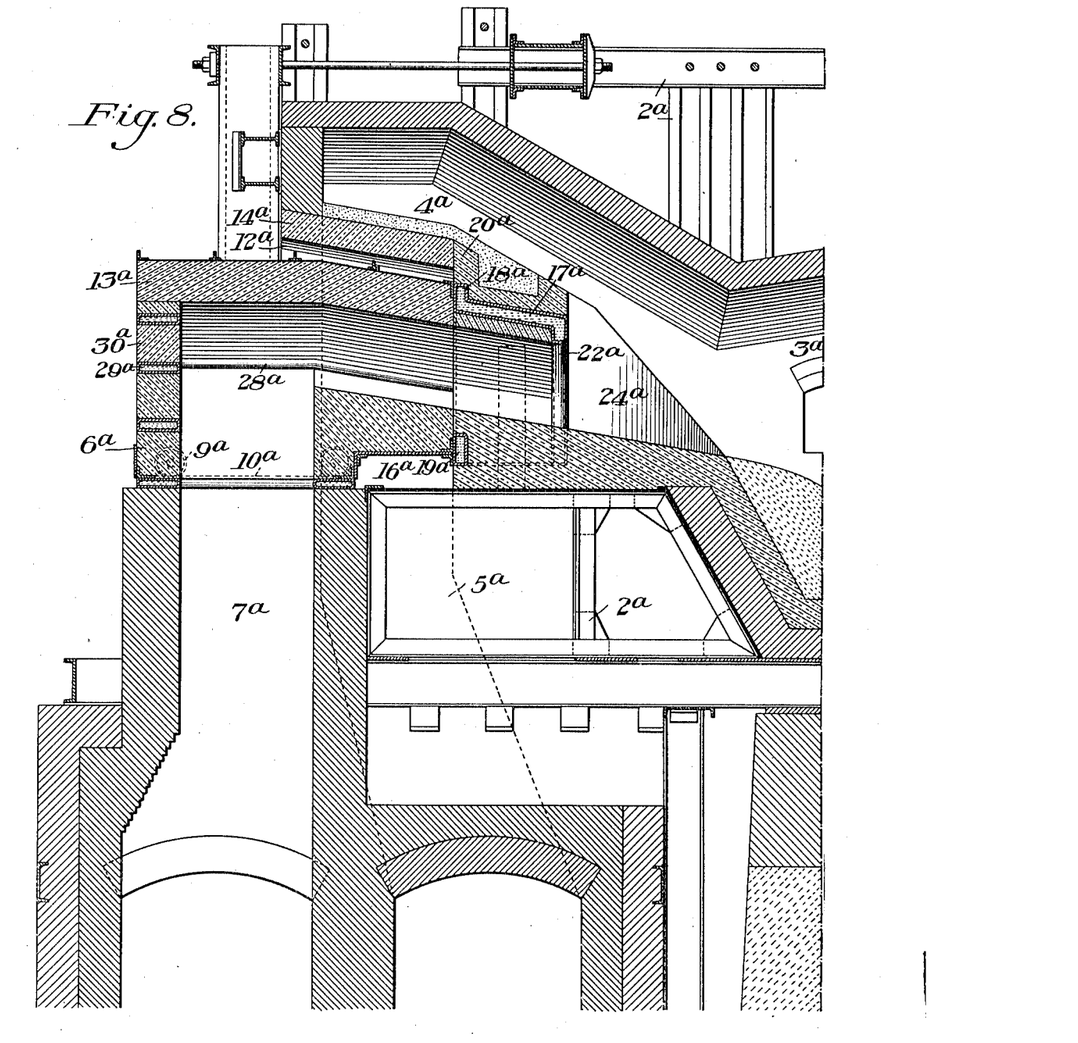

In Figs. 7 and 8 I have shown my invention applied to a furnace of the dog-house type. In these figures, the parts are given the same reference numerals as in the preceding figures, but with the letter "a" added thereto. The main difference in this form is that the gas uptake 7ª is offset rearwardly with respect to the air ports 5ª. This brings the rear portion of the hood 6ª outside of the rear walls of the air uptakes, where it is surrounded by the atmosphere. This construction also somewhat narrows up the air chambers 25ª between the air uptakes and the end wall of the furnace proper. When it becomes necessary to renew or repair the gas port, the hood 6 or 6ª is first pulled outwardly on the tracks 10 or 10ª, breaking the joint at 21 or 21ª. The nose portion of the port can then be torn out and re-built.

In Figs. 9 to 15, inclusive, I have shown a modification of my invention. In these figures, where the parts of the structure are the same or similar to corresponding parts of the structure first described, corresponding reference numerals are applied to corresponding parts with the letter "b" added thereto. In this form of my invention, the cooling member 17ᵇ, in addition to the cross-connection 19ᵇ is also shown as having a hollow bottom portion 32, the interior space of which is in communication with the water-circulating space in the body of said member. This construction gives a circulation of water entirely around the nose end of the gas port. In this form of my invention, the removable hood 6ᵇ, instead of having a simple metal supporting frame as in the form first described, is provided with a supporting frame which is largely hollow. This frame is shown in detail in Figs. 12, 13 and 14, and its general arrangement will appear from Figs. 9, 10 and 11. It consists of a shell having the hollow side portions 33 connected at the rear by the hollow cross-portions 34 arranged one above another and connected at the front by the upwardly offset bottom portion 35 and the upwardly arched hollow extension 36. The side portions 33 are provided with the hollow inward extensions 37 at their upper ends, and with the similar inward extensions 38 at their lower ends, in the manner best shown in Fig. 14. The extensions 37 are preferably about equal in extent to the thickness of the refractory wall of the port, so that their outer edges will be substantially flush with the exposed surface of said wall. The front end of the shell is also preferably provided with the hollow lip or flange 39. The refractory portion 40 of the hood is built into and within this shell in the manner shown in Figs. 9, 10 and 11. The body portion of the shell extends upwardly to a height which is shown as being slightly below the longitudinal center line of the gas port. The upper portion of the frame, which extends around and incloses the upper portion of the hood is composed of the arched extension 36 before described, and by a number of transversely upwardly arched circulating pipes 41. These pipes 41 at their lower ends connect into the upper portions of the side members 33, and are preferably united at their upper and central portions by a longitudinal water-circulating pipe 42.

Figure 12:
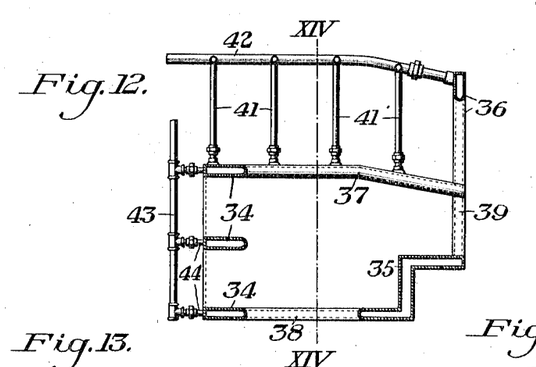
Fig. 12 is a longitudinal section of the cooling shell and cage of Fig. 9.
Figure 13:
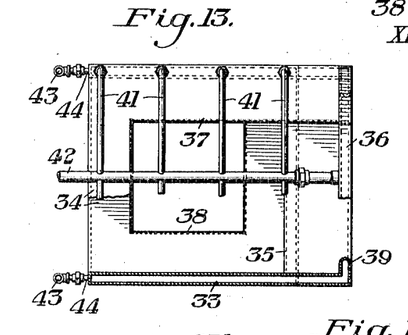
Fig. 13 is a plan view of the same partly in section.
Figure 14:
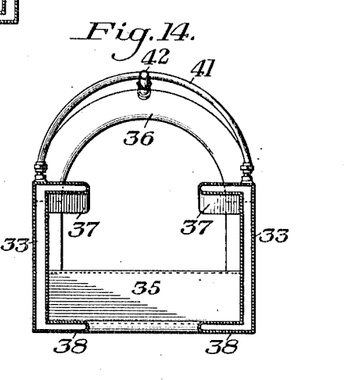
Fig. 14 is a section on the line XIV—XIV of Fig. 12.
Figure 15:
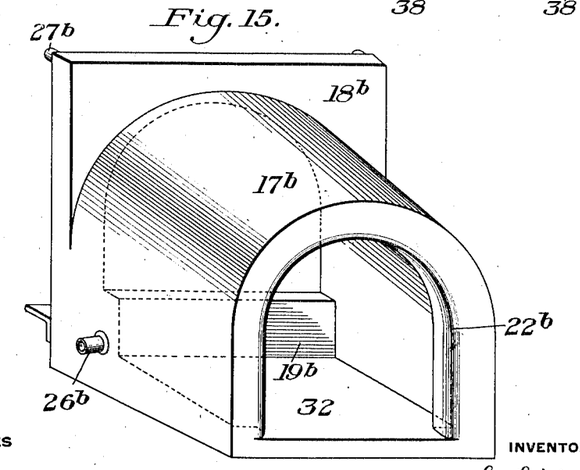
Fig. 15 is a perspective view of the cooling shell for the nose portion of the gas port of Fig. 9.

43 designates circulating connections at the outer end of the frame, and having connections 44 with the interior of the shell at a number of different points. Preferably the circulation is so arranged that the cooler water will enter the pipes 43 and flow through the connections 44; and after circulating through the shell will rise through the arched pipes 41 and out through the top connecting pipe 42. Any suitable arrangement of circulating connections may, however, be provided. It will be understood that the frame just described not only provides a secure supporting frame for the hood member, but that it also provides for an effective circulation of the cooling medium for the protection of the refractory portions of the hood.

Figure 9:
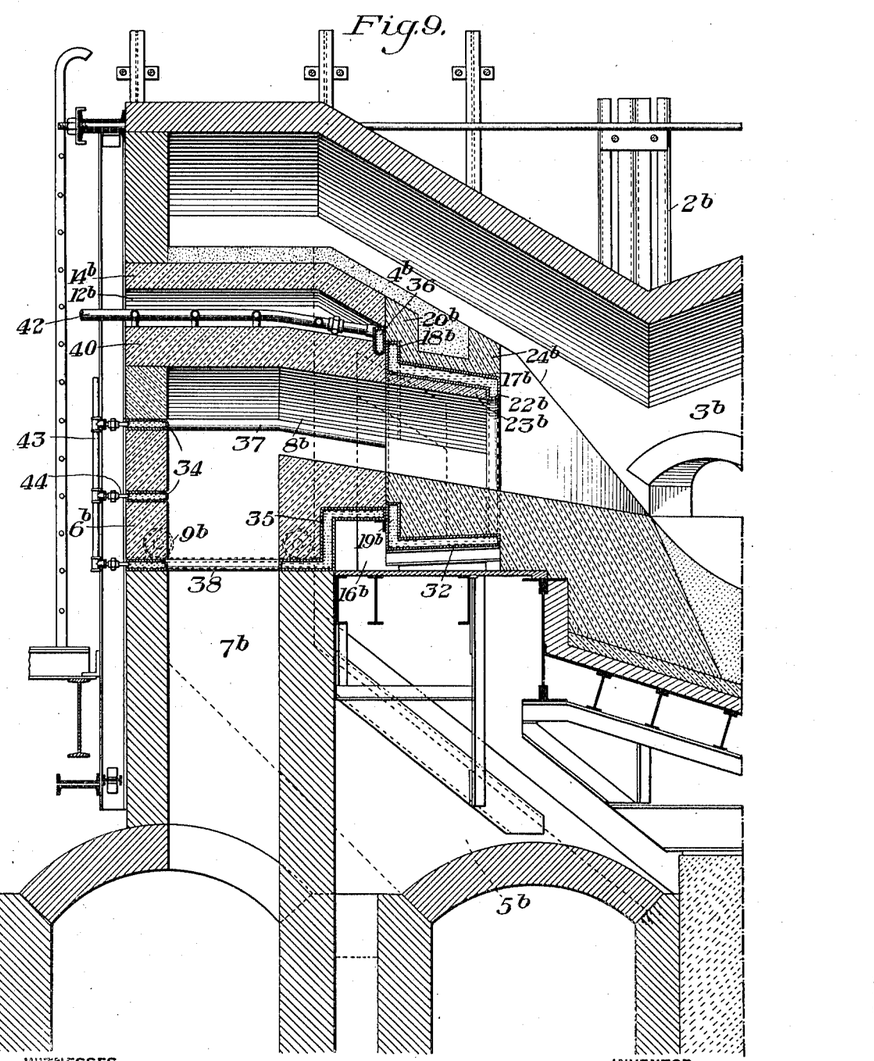
Fig. 9 is a view similar to Fig. 1, but showing another modification.
Figure 10:
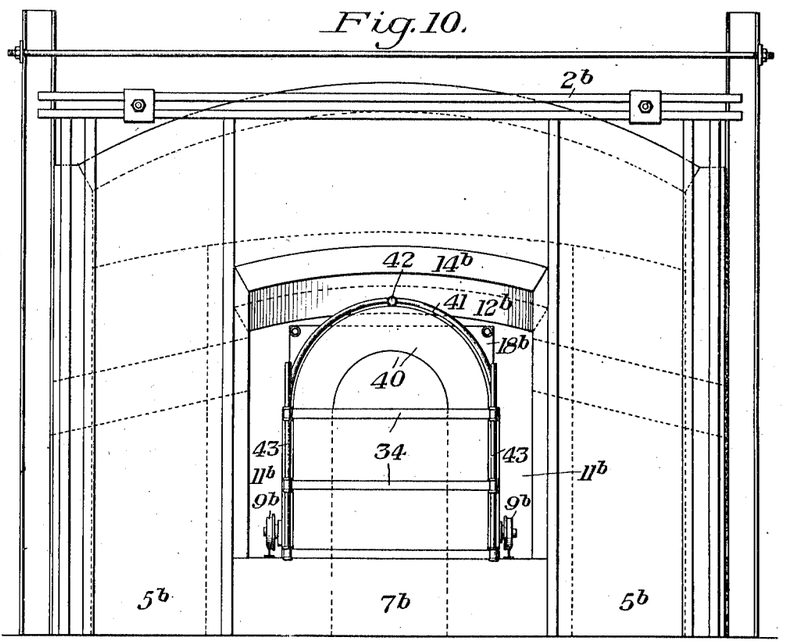
Fig. 10 is an end elevation of the structure shown in Fig. 9.
Figure 11:
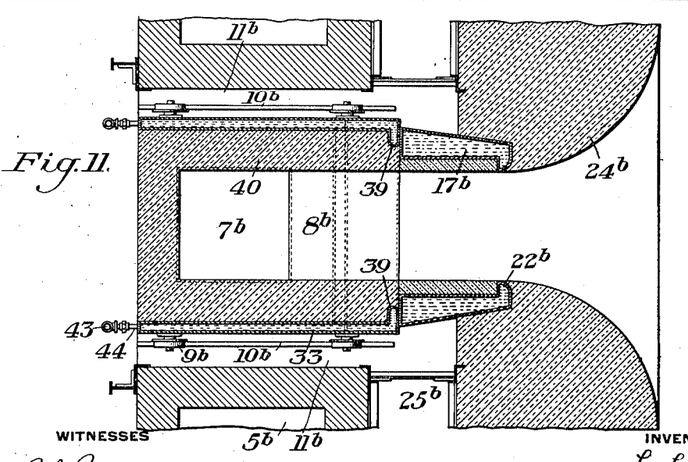
Fig. 11 is a horizontal section through a portion of said structure.

The inwardly extending hollow lip or flange 22ᵇ of the member 17ᵇ, like the similar lip or flange 22 of the member 17 before described, constitutes an important feature of my invention, since it defines and determines the nose end of the gas port. It is well known that in order to secure the best results in an open hearth furnace, the air and gas should be mixed at a certain point and at a certain distance from the hearth. This point of mixture occurs at the nose end of the gas port. Great difficulty has heretofore been experienced in keeping this point constant, owing to the rapid cutting away of the nose of the port. In the constructions described, the hollow water-cooled flange 22 or 22ᵇ completely surrounds and protects the nose end of the gas port. The mixture of air and gas may therefore be made to occur at the desired point throughout the life of the port.

While I have illustrated only one end portion of a furnace, it will be understood that my invention is applicable to both ends thereof.

What I claim is:—

1. A reversing regenerative furnace having a gas port formed with a separate joint at a point between the inner wall of the gas uptake and the inner end of the port, the inner end or nose portion of such port having a U-shaped hollow cooling member surrounding its top and sides, said portion also supporting and acting to cool the floor of an overlying air port; substantially as described.

2. A reversing regenerative furnace having transversely separated air uptakes which at their upper ends open into a common air port leading into the furnace, said port having the major portion of its walls formed as a unitary part of the furnace structure, a gas uptake between the air uptakes, and a gas port leading from the upper portion of the air uptake into the furnace, a portion of said gas uptake and gas port being formed by a hood member which is removable endwise into and out of position underneath the floor of the air port, the inner portion of the said gas port being formed by a U-shaped cooling member which separably abuts the inner end of the hood member, and which extends over and also at the sides of the nose end of the gas port, said U-shaped member supporting interiorly a refractory lining for the said nose portion, and supporting exteriorly the inner end portion of the floor of the air port; substantially as described.

3. A reversing regenerative furnace having transversely separated air uptakes which at their upper ends open into a common air port leading into the furnace, said port having the major portion of its walls formed as a unitary part of the furnace structure, a gas uptake between the air uptakes, and a gas port leading from the upper portion of the air uptake into the furnace, a portion of said gas uptake and gas port being formed by a hood member which is removable endwise into and out of position underneath the floor of the air port, the inner portion of the said gas port being formed by a U-shaped cooling member which separably abuts the inner end of the hood member, and which extends over and also at the sides of the nose end of the gas port, said U-shaped member supporting interiorly a refractory lining for the said nose portion, and supporting exteriorly the inner end portion of the floor of the air port, and there being an air space which surrounds the major portion of the hood member; substantially as described.

4. A reversing regenerative furnace having its gas port formed in two portions with a separable joint between them at a point between the inner wall of the gas uptake and the inner end of the port, the rear portion of the port being movable rearwardly away from the nose or inner end portion, and said nose or inner end portion having a U-shaped cooler surrounding it at the top and sides, said portion also supporting and cooling the floor of an overlying air port; substantially as described.

5. A reversing regenerative furnace having a removable hood portion forming the upper part of the gas uptake and the outer or rear portion of the gas port of the furnace, the inner end portion of said gas port having a U-shaped water-cooled member surrounding its top and sides, and said member having an upward extension and also a cross connection at its rear end, the rear sides of said extension and connection forming part of the joint between the two portions of the port, and said upward extension also projecting into the floor portion of an overlying air port; substantially as described.

6. A port cooler for reversing regenerative furnaces, having a U-shaped portion formed with an upward hollow extension at its rear end, and also having a hollow cross-connection below said extension; substantially as described.

7. A port forming and cooling structure for furnaces, comprising a hollow member having an arched top and substantially parallel depending side legs, said top and legs having an inwardly projecting hollow flange at their inner end, said flange being adapted to abut and protect the inner end of a refractory lining for both the top and the side legs of said member; substantially as described.

8. A port cooler for furnaces, comprising a hollow U-shaped member having a continuous inwardly extending hollow flange at its inner end, and having a flat hollow upward extension at its outer end; substantially as described.

9. A port cooler for furnaces, comprising a member having hollow sides, an arched hollow connecting top portion, and a hollow connecting bottom portion, and having an inwardly extending hollow flange at its nose end, said flange extending continuously at both the sides and the top portion of said member; substantially as described.

10. A reversing regenerative furnace having a removable hood portion forming the upper part of the gas uptake and the outer or rear portion of the gas port of the furnace, said hood portion comprising a shell having hollow side portions provided with hollow cross connections; substantially as described.

11. A cooling and supporting structure for reversing regenerative furnaces, comprising a hollow frame having side portions, partial top and bottom portions, and transverse connecting portions, together with means for effecting a circulation of the cooling fluid through said portions; substantially as described.

12. A supporting and cooling structure for use in reversing regenerative furnaces, comprising a shell-like frame having interior water-circulating spaces, and also having a series of spaced upwardly-arched circulating pipes; substantially as described.

13. A reversing regenerative furnace having a removable hood portion, said hood portion comprising a hollow shell for supporting and cooling the lower part of the hood, and also having a series of water-circulating members extending over the upper portion of the hood; substantially as described.

14. A reversing regenerative furnace having a removable hood forming the upper part of the gas uptake, and the outer or rear portion of the gas port of the furnace, said hood having an arched roof wall and having a hollow supporting frame formed with arched circulating members extending over said arched roof wall; substantially as described.

15. A reversing regenerative furnace having a removable hood forming the upper part of the gas uptake and the outer or rear portion of the gas port of the furnace, and comprising a refractory wall and a supporting and cooling frame for said wall, said frame having portions surrounding and built within said wall, and also having circulating connections over the top of the hood; substantially as described.

In testimony whereof, I have hereunto set my hand.

LUTHER L. KNOX.

Witnesses:
　JESSE B. HELLER,
　GEO. B. BLEMING.